US008086329B2

United States Patent
Keefover et al.

(10) Patent No.: US 8,086,329 B2
(45) Date of Patent: Dec. 27, 2011

(54) METHOD OF ACTUATOR CONTROL

(75) Inventors: Robert D. Keefover, Lake Orion, MI (US); Joseph Labataille, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 602 days.

(21) Appl. No.: 11/921,187

(22) PCT Filed: May 30, 2006

(86) PCT No.: PCT/US2006/020682
§ 371 (c)(1),
(2), (4) Date: Nov. 28, 2007

(87) PCT Pub. No.: WO2006/130534
PCT Pub. Date: Dec. 7, 2006

(65) Prior Publication Data
US 2009/0267557 A1    Oct. 29, 2009

Related U.S. Application Data

(60) Provisional application No. 60/685,917, filed on May 31, 2005.

(51) Int. Cl.
G05B 23/02    (2006.01)
G05B 23/00    (2006.01)

(52) U.S. Cl. ............ 700/47; 700/29; 700/254; 700/282; 702/94; 702/98; 702/105; 701/59; 701/84; 701/60; 123/406.33; 337/82; 337/94; 337/129; 337/347; 337/319; 318/565; 477/146; 477/32

(58) Field of Classification Search ............ 700/47; 318/565; 702/94, 88, 105; 701/103, 58–60; 123/406.32–406.47; 337/82, 94, 129, 119, 337/347, 319, 360, 368, 323; 250/339.09, 250/341.5
See application file for complete search history.

(56) References Cited

U.S. PATENT DOCUMENTS

| | | | | |
|---|---|---|---|---|
| 4,707,789 | A | * | 11/1987 | Downs et al. .................... 701/58 |
| 5,265,576 | A | * | 11/1993 | McMahon et al. ............ 123/458 |
| 5,403,250 | A | * | 4/1995 | Juergens ....................... 477/176 |
| 5,526,280 | A | | 6/1996 | Consadori et al. |
| 5,574,211 | A | | 11/1996 | Shimada et al. |
| 5,760,289 | A | | 6/1998 | Skottegard |
| 6,128,902 | A | | 10/2000 | Kolmanovsky et al. |
| 6,298,255 | B1 | | 10/2001 | Cordero et al. |
| 6,529,815 | B2 | | 3/2003 | Hawkins et al. |
| 6,536,261 | B1 | | 3/2003 | Weldon et al. |

(Continued)

FOREIGN PATENT DOCUMENTS
EP    0512690    11/1992
(Continued)

*Primary Examiner* — Ryan Jarrett
*Assistant Examiner* — Olvin Lopez Alvarez
(74) *Attorney, Agent, or Firm* — Warn Partners, P.C.

(57) ABSTRACT

The present invention is related to a method of controlling a device having a calibration process. The calibration process has a partial calibration routine and a calibration routine. A detector within the control system is capable of receiving one or more input signals and determining whether a partial calibration or calibration should occur. The first step in the process involves starting the control method where the detector receives input signals or generates it own data within the detector. The detector also determines whether a partial calibration routine or a calibration routine will take place based upon the value of the input signals received. A partial calibration routine will be performed if the input signals to the detector do not favor a calibration.

20 Claims, 2 Drawing Sheets

U.S. PATENT DOCUMENTS

| | | | |
|---|---|---|---|
| 6,965,826 B2 * | 11/2005 | Andres et al. | 701/115 |
| 7,162,356 B2 * | 1/2007 | Fuwa et al. | 701/104 |
| 7,374,513 B2 * | 5/2008 | Whitton | 477/146 |
| 7,467,033 B2 * | 12/2008 | Miller et al. | 701/22 |
| 7,707,821 B1 * | 5/2010 | Legare | 60/277 |
| 2002/0171819 A1 | 11/2002 | Cheung | |
| 2003/0229430 A1 | 12/2003 | Beek | |
| 2004/0218199 A1 | 11/2004 | Regimbal | |
| 2004/0221899 A1 | 11/2004 | Parsons et al. | |
| 2005/0001188 A1 | 1/2005 | Everingham et al. | |
| 2005/0021217 A1 | 1/2005 | Bhargava et al. | |
| 2005/0107212 A1 * | 5/2005 | Soliman et al. | 477/156 |
| 2005/0185227 A1 * | 8/2005 | Thompson | 358/474 |

FOREIGN PATENT DOCUMENTS

| | | |
|---|---|---|
| FR | 2788143 | 7/2000 |
| WO | WO 2004/022949 | 3/2004 |

* cited by examiner

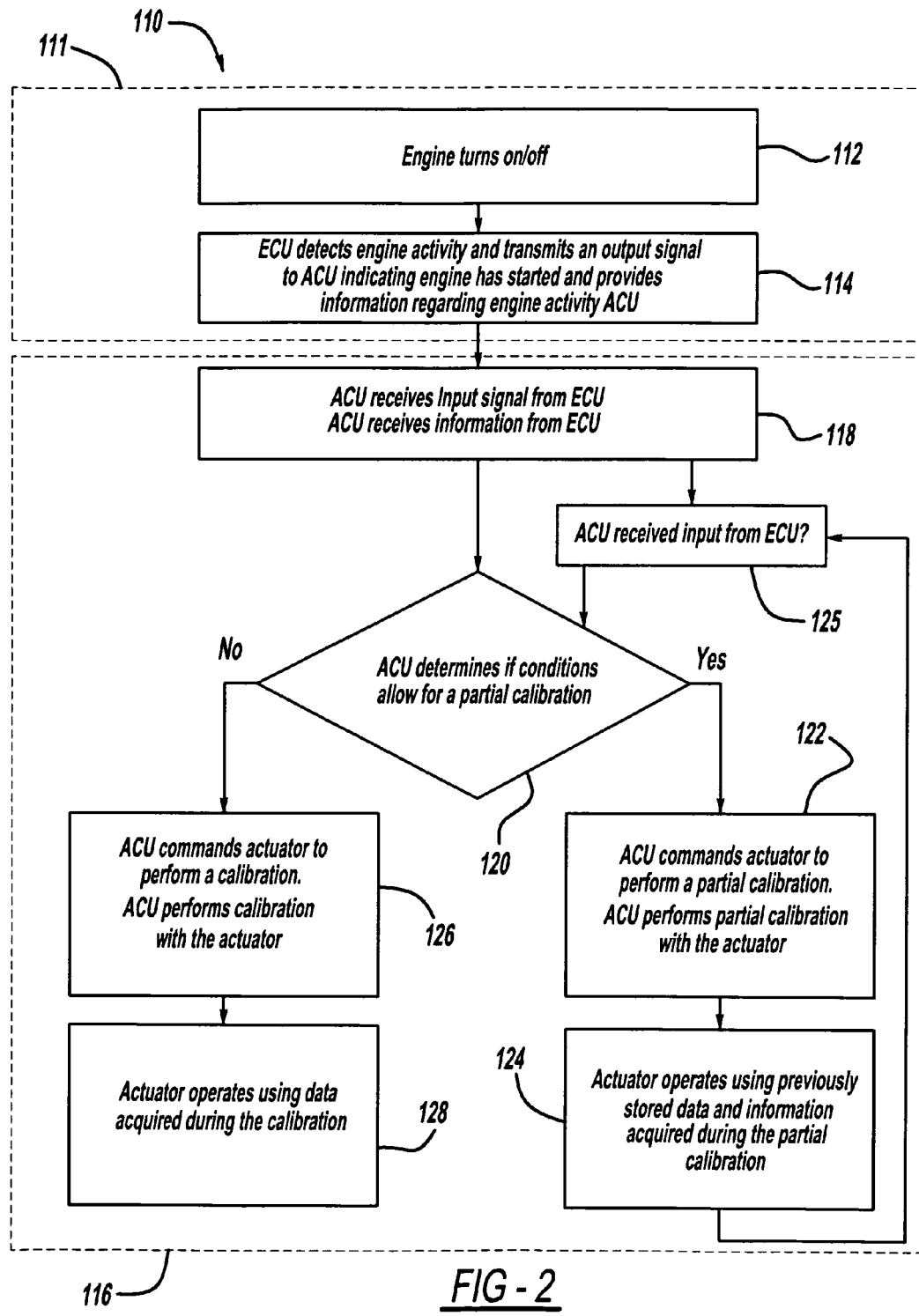

METHOD OF ACTUATOR CONTROL

This application is a National Stage of International Application No. PCT/US2006/020682, filed May 30, 2006. This application claims priority to U.S. Patent Application No. 60/685,917 filed on May 31, 2005. The disclosures of the above applications are incorporated herein by reference.

FIELD OF THE INVENTION

The present invention relates to a control strategy for self calibrating actuators under specific conditions, wherein the control strategy further provides a partial calibration feature that will maintain adequate actuator performance.

BACKGROUND OF THE INVENTION

It is common practice in the automotive industry to use electric actuators to control various vehicular functions. These control actuators are often faced with operating in harsh environments that are subject to change. As a result the operation of these actuators can become misaligned or sometimes blocked. Thus periodic calibration or confirmation of the actuator function is often necessary to ensure that the actuator has a proper range of operation. An example of a type of system where calibration or confirmation is desirable is in a turbocharger. The actuator in a turbocharger is used to control the turbocharger unit and the boost pressure that the unit provides to the engine. If the actuator becomes misaligned then the valves in the turbocharger may not open properly and cause an incorrect pressure differential across the turbine. The misadjustment or misalignment of the valves can result in poor engine performance, failure to meet emissions legislation, or damage to the turbocharger and related vehicle components.

It is desirable to configure or program the actuator to calibrate itself when predetermined time periods or conditions exist. Doing so will prevent an intrusive event that may affect the engine performance, vehicle emissions, or potential system damage.

SUMMARY OF THE INVENTION

The present invention is related to a method of controlling a device having a calibration process. The calibration process has a partial calibration routine and a calibration routine. A detector within the control system is capable of receiving one or more input signals and determining whether a partial calibration or calibration should occur. The first step in the process involves starting the control method where the detector receives input signals or generates its own data within the detector. Next the detector determines if a calibration is required based on the values. The detector also determines whether a partial calibration routine or a calibration routine will take place based upon the value of the input signals received. A partial calibration routine will be performed if the input signals to the detector do not favor doing more than a partial calibration. If a partial calibration routine occurs, then the device is commanded to move to a first function or limitation of its operating range so that the device learns the characteristic of the limitation. Next the device operates using the learned characteristic and a previously stored value of a second characteristic representing the second limitation or function of the operating range of the device. If it is determined that a calibration routine will take place then the device will learn the first characteristic as described above, and a second characteristic located at a second function or limitation of the operating range of the device. After a calibration routine the device will then operate using the learned values of the first characteristic and second characteristic obtained during the calibration routine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a schematic diagram of the actuator control method operating in a device.

DETAILED DESCRIPTION OF THE PREFERRED EMBODIMENTS

Figure 1:
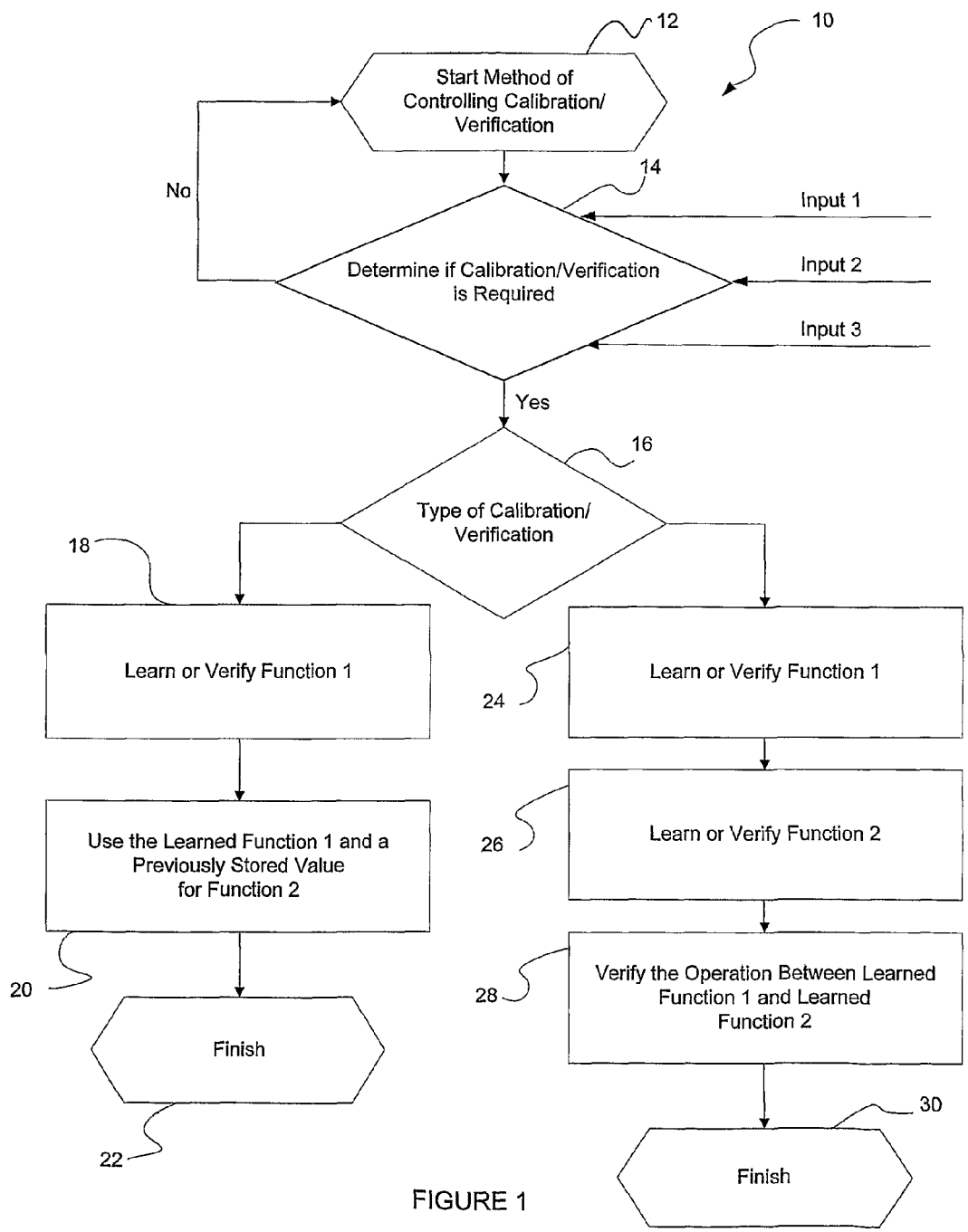
FIG. 1 is a schematic diagram of a control strategy method for operating a device.

The following description of the preferred embodiment(s) is merely exemplary in nature and is in no way intended to limit the invention, its application, or uses.

Referring to FIG. 1, the control strategy 10 is shown wherein a device is programmed with the control strategy 10. The control strategy 10 begins with a step 12 that includes start command where the method of controlling the calibration/verification sequence is initiated. Throughout the specification, claims and drawings, reference will be made to calibrating or learning the limitations of a device. However, it is within the scope of this invention to also include in the definition of calibration as a verification sequence. Calibration as used herein is defined as learning the limitations or functions of a device as well as verifying the limitations or functions of the device. Thus, if a device has already been calibrated so that the approximate values of its functions have been determined, a verification routine will be necessary during the life of the device to determine or verify that it is operating properly and that the values for the functions on the device are still correct.

After the step 12 the device will proceed to a step 14 and determine if the calibration or verification of the device's parameters is required. This determination is based on various inputs, shown in FIG. 1 as input 1, input 2 and input 3, which are indicative of various conditions that exist. The type and number of inputs used will vary depending upon the particular application of the method described herein. However, using this method in automotive engine systems will almost certainly include such inputs that generally convey information pertaining to the vehicle's electric system, engine speed and vehicle speed. If it is determined that no calibration or verification is required or possible then the control strategy 10 will repeat the step 12 and continue to monitor the inputs at step 14 until it is determined that the calibration or verification is required.

Once it has been determined at step 14 that a calibration or verification will take place the device will advance to a step 16. At step 16 the device will determine which type of calibration or verification to perform. The device may command a partial calibration, which is just one portion of a calibration routine, by learning or verifying the value of a first function at a step 18. At a step 20 the device will operate using the value of the first function and a previously stored value for a second function. The previously stored value can be a pre-programmed value, an end of line value, or a value obtained from the last calibration routine. The partial calibration will then be completed at a finish step 22 where the device will continue to operate using the learned position obtained at step 18 and the previously stored value for function 2 supplied at step 20 for operation of the device.

If at step 16 the device determines that the calibration routine is needed then the device will learn the position of a first function at step 24. The device will learn the position of a second function at a step 26. At a step 28 the device will verify the operation of the operating range of the device by moving between the learned position of the first function and the learned position of the second function. The device will then finish the calibration routine at a step 30 and operate using the learned positions obtained at steps 24 and 26.

The control method described in FIG. 1 has many applications for various devices. For example, the control method can be used in conjunction with any type of air pump where the span air flow pressure must be learned or calibrated. Additionally, some devices draw a certain amount of current and the range of current that can be drawn to a device may need to be learned during operation of the device. Also, other factors such as angular revolution, linear movement or torque determination may be desirable functions that can be monitored using the control system described in FIG. 1. FIG. 1 uses the terms calibration and verification, and these terms have different meanings. For example, calibration implies that the device is learning the position of an operational limitation, whereas verification means that the device is verifying the position or the value of an operational range as opposed to learning the value. While calibration and verification take on two meanings, the terms will be used interchangeably throughout this specification. However, it is within the scope of this invention for the control strategy 10 to be used either in conjunction with calibration or it can also be appreciated the invention is not limited in the number of functions that can be included in the calibration. The example described a device or system with 2 functions but it can be any number of functions.

FIG. 2 depicts an embodiment of the invention where the control strategy 110 is incorporated in a system having two controllers, an engine control unit (ECU) 111 and actuator control unit (ACU) 116. At a step 112, the engine is turned on or off. At a step 114, the engine control unit (ECU) detects engine activity and transmits information regarding the engine activity to the ACU 116 in the form of an input signal. The input signal also contains engine speed, electrical system information and other factors.

The ACU 116 receives the information from the ECU 111. The ACU 116 then determines at a step 120 whether or not conditions allow for the actuator to perform a partial calibration routine. If at step 120 it is determined that a calibration routine is not possible due to the engine conditions or other factors, then at step 122 the ACU 116 performs a partial calibration with the actuator 122. A partial calibration is where the ACU 116 commands the actuator to drive to a second function. The ACU 116 then records the value of the second function, replacing learned values from previous partial calibrations or preprogrammed values. At step 124, the actuator then operates using previously stored data regarding a first function and the information acquired during the partial calibration 122. At step 120, the ACU 116 will continue to monitor and determine when conditions will allow for a calibration routine step 126 to be performed. For example, when the engine is sitting at idle or is cruising at ideal cruising speeds, the ACU 116 performs the step 126 of calibration with the actuator. During step 126, a calibration routine of the actuator is driven to all the functions within the range of the actuator. The ACU 116 then records the values of all the actuator's functions, replacing the learned values from previous calibration routines. Then at step 128 the ACU 116 operates using the data acquired during the calibration.

In the preferred embodiment the ECU 111 is configured to transmit information 114 to the ACU 116, and the ACU 116 is configured to receive information 118 from the ECU 111. The control strategy 110 can be implemented in applications where there is a single controller, such as a configuration where the ECU directly controls the actuated device. It is also within the scope of the present invention for the ACU 116 to be integrated into the device or for the ACU 116 to be a separate unit. Additionally, it is possible to implement the control strategy 110 of the present invention into a situation where there are two or more controllers. Such an embodiment would allow for the coordination for multiple controller units making or allowing the control strategy to operate based on multiple variables. For example, multiple controllers could input signals to the ECU so that the ECU could command the actuator to perform various learn sequences based upon signal values from various engine system components. One example of such an alternate embodiment would be where the ACU receives a signal from the ECU that is representative of engine conditions, while another variable inputted to the ECU could be a value inputted from a controller that monitors electrical consumption of the vehicle's cabin compartment.

It is possible for the conditions to direct the ACU 116 to perform step 126 when electrical disturbances in the vehicle may affect the performance of an actuator, which would then require the actuator to perform a calibration process. Electrical disturbances include high voltage, low voltage, or intermittent voltage; where an intermittent voltage could be caused by manufacturing defects, mechanical stress, or corrosion. However, before the ACU 116 performs a calibration with the actuator it must be determined if the ACU 116 has received information from the ECU 111. If the ACU 116 has received information from the ECU 111 then the ACU 116 can determine if conditions allow for a calibration at step 120. The reason the ACU 116 must receive information from the ECU 118 before the ACU 116 can determine if conditions allow for a calibration routine is to ensure that the ACU 116 does not perform a calibration routine with the actuator during certain engine operating conditions. Therefore, after the steps 122, 123 of performing a partial calibration routine are complete, the ACU 116 disregards other factors that direct the ACU 116 to command the actuator to perform the step 120 of a second self calibration process until the ECU transmits a second input signal to the ACU 116, to allow the ACU 116 to command the actuator to run the second self calibration process. Under certain engine operating conditions a calibration process is performed it can cause poor engine performance, failure to meet emissions legislation, or damage to vehicle components. Also prior to engine start-up or at engine shut down the signals transmitted by the ECU can cause the ACU to command a calibration process. A specific example includes calibration or verification that must occur prior to an engine reaching a specific RPM during starting.

If the ACU 116 has not received information from the ECU, but the conditions have directed the ACU 116 to perform a calibration; the ACU 116 will perform a partial calibration with the actuator at step 122. A partial calibration will not cause undesirable effects while being performed. After the partial calibration has been performed the actuator operates using previously stored data and the information acquired during the partial calibration at step 124. The control strategy 110 must then reset in order to determine if the conditions allow for a calibration at step 120.

The devices that the present control strategies 10, 110 can be used with are devices or actuators such as, but not limited to vehicle engine actuators including turbochargers, exhaust gas recirculation valves, throttle valves, shift actuators, transfer case shift mechanisms, clutches and transmission shift mechanisms, variable cam timing mechanisms, tuning actuators, fuel injectors, etc. The control strategies 10, 110 of the present invention are used to learn or calibrate the functions of these devices and other devices having similar functions. Functions include but is not limited to mechanical stops, current or voltage fluctuation, air flow capacity, torque range angular movement, fuel metering, fuel quantity, force, linear travel, rotary movement, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a calibration process comprising the steps of:
    providing an actuator for use in an engine;
    providing a calibration process having a partial calibration routine and a calibration routine for determining if said actuator is properly functioning;
    providing one or more input signals;
    starting a control method;
    wherein a determination is made whether a partial calibration or a calibration routine will take place based upon the values of said one or more input signals;
    commanding said partial calibration routine if said values of said one or more input signals favor said partial calibration routine, wherein said actuator learns or verifies a first function and determining if said actuator is properly functioning; and
    operating said actuator using said partial calibration routine.

2. The method of claim 1 wherein said partial calibration routine is based in part on an operating range of the actuator.

3. The method of claim 1 wherein the method of controlling the calibration process is used for determining operational functions of said actuator, the operational functions are selected from the group comprising one of: mechanical stops, current or voltage fluctuation, air flow capacity, torque range, fuel metering, fuel quantity, force, linear travel or rotary movement.

4. The method of claim 1 wherein said one or more input signals relate to one or more of a group comprising: vehicle electrical system values, engine speed or vehicle speed.

5. The method of claim 1 wherein said first function comprises:
    one of the following of the group comprising, air flow of an air pump, range of electrical current, angular revolution and torque determination.

6. The method of claim 1 wherein said method of controlling a calibration process is used for calibrating said actuator selected from one of the group comprising:
    turbochargers, exhaust gas recirculation valves, throttle valves, shift actuators, transfer case shift mechanisms, clutches and transmission shift mechanisms, variable cam timing mechanisms, fuel injectors or tuning actuators.

7. The method of claim 1 further comprising the steps of commanding a calibration to take place wherein said actuator learns or verifies said first function of said operating range of said actuator;
    learning or verifying a second function of said operating range of said actuator; and
    operating said actuator using said first function and said second function values obtained during said calibration.

8. The method of claim 1 further comprising the steps of:
    providing an engine control unit (ECU) for transmitting an input signal and said actuator includes an actuator control unit (ACU), wherein said ACU is configured to receive said input signal from said ECU;
    wherein said step of determining whether a partial calibration routine or a calibration routine takes place further comprises:
    generating said input signal from said ECU and transmitting said input signals to said ACU and said ACU commands said actuator to perform said step of performing said partial calibration routine, wherein after said partial calibration routine is complete, said ACU disregards other factors that direct said ACU to command said actuator to perform a second calibration routine or partial calibration routine until said ECU transmits a second input signal to said ACU, to allow said ACU to command said actuator to run said calibration routine or partial calibration routine.

9. The method of claim 8 wherein the method of controlling a calibration process for determining operational functions of said actuator is selected from the group comprising one of: mechanical stops, current or voltage fluctuation, air flow capacity, torque range, fuel metering, fuel quantity, force, linear travel or rotary movement.

10. The method of claim 8 wherein said actuator is one selected from the group comprising turbochargers, exhaust gas recirculation valves, throttle valves, shift actuators, transfer case shift mechanisms, clutches and transmission shift mechanisms, variable cam timing mechanisms, fuel injectors or tuning actuators.

11. The method for controlling a calibration process of claim 8 wherein said ECU transmits said input signal to said ACU prior to said engine being started.

12. The method for controlling a calibration process of claim 8 wherein said ECU transmits a second input signal to said ACU after said engine is shutdown.

13. The method of claim 1 further comprising the steps of:
    providing an engine control unit (ECU) for transmitting an input signal;
    providing an actuator control unit (ACU) that is associated with said actuator, wherein said ACU is configured to receive said input signal from said ECU;
    wherein said step of determining whether a partial calibration routine or a calibration routine takes place further comprising the steps of:
    generating said input signal from said ECU and transmitting said input signal to said ACU, wherein said ACU receives said input signal and said ACU commands an actuator to perform a self-calibration process, wherein after said self-calibration process is complete, other factors direct said ACU to command said actuator to perform a partial calibration process.

14. The method of claim 13 wherein the method of controlling a calibration process is used for determining operational functions of said actuator selected from the group comprising one of: mechanical stops, current or voltage fluctuation, air flow capacity, torque range, fuel metering, fuel quantity, force, linear travel or rotary movement.

15. The method for controlling a calibration process of claim 13 wherein said ECU transmits said input signal to said ACU prior to said engine being started.

16. The method for controlling a calibration process of claim 13 wherein said ECU transmits a second input signal to said ACU after said engine is shutdown.

17. The method for controlling a calibration process of claim 13 further comprising the step of operating said actuator using a learned or verified value obtained from said partial calibration routine and a previous stored value that is one selected from a group comprising a pre-programmed value, an end of line value or a value from a last calibration of the actuator.

18. The method for controlling a calibration process of claim 13 wherein said actuator is one selected from the group comprising turbo chargers, exhaust gas recirculation valves, throttle valves, shift actuators, transfer case shift mechanisms, clutches and transmission shift mechanisms, variable cam timing mechanisms, fuel injectors or tuning actuators.

19. The method of claim 1 wherein said step of operating using said partial calibration further comprises the use of the first function and a previously stored value.

20. The method of claim 19 wherein said previously stored value is one of a group comprising a pre-programmed value, or a value from a previous calibration.

* * * * *

UNITED STATES PATENT AND TRADEMARK OFFICE
CERTIFICATE OF CORRECTION

| | | |
|---|---|---|
| PATENT NO. | : 8,086,329 B2 | Page 1 of 3 |
| APPLICATION NO. | : 11/921187 | |
| DATED | : December 27, 2011 | |
| INVENTOR(S) | : Robert D. Keefover and Joseph Labataille | |

It is certified that error appears in the above-identified patent and that said Letters Patent is hereby corrected as shown below:

Title Page, item (57),
ABSTRACT
"The present invention is related to a method of controlling a device having a calibration process. The calibration process has a partial calibration routine and a calibration routine. A detector within the control system is capable of receiving one or more input signals and determining whether a partial calibration or calibration should occur. The first step in the process involves starting the control method where the detector receives input signals or generates it own data within the detector, teh detector also determines whether a partial calibration routine or a calibration routine will take place based upon the value of the input signals received. A partial calibration routine will be performed if the input signals to the detector do not favor a calibration."

Should be

-- The present invention is related to a method of controlling an actuator having a calibration process. The calibration process has a partial calibration routine and a calibration routine. The control system is capable of receiving one or more input signals and determining whether a partial calibration or calibration should occur. The first step in the process involves starting the control method where the actuator receives input signals or generates its own data within the actuator. A determination whether a partial calibration routine or a calibration route will take place based upon the value of the input signals received. A partial calibration routine will be performed if the input signals do not favor a calibration. --

Column 2,
Line 29, "device" should be -- actuator --.

Column 2,
Line 34, "device" should be -- actuator --.

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 8,086,329 B2

Column 2,
Line 38, "device" should be -- actuator --.

Column 2,
Line 39, "device" should be -- actuator --.

Column 2,
Line 42, "device" should be -- actuator --.

Column 2,
Line 43, "device" should be -- actuator --.

Column 2,
Line 45, "device" should be -- actuator --.

Column 2,
Line 46, "device's" should be -- actuator's --.

Column 2,
Line 61, "device" should be -- actuator --.

Column 2,
Line 62, "device" should be -- actuator --.

Column 2,
Line 63, "device" should be -- actuator --.

Column 2,
Line 66, "device" should be -- actuator --.

Column 3,
Line 4, "device" should be -- actuator --.

Column 3,
Line 7, "device" should be -- actuator --.

Column 3,
Line 10, "device" should be -- actuator --.

Column 3,
Line 11, "device" should be -- actuator --.

Column 3,
Line 12, "device" should be -- actuator --.

Column 3,
Line 14, "device" should be -- actuator --.

Column 3,
Line 18, "devices" should be -- actuators --.

Column 3,
Line 21, "devices" should be -- actuators --.

Column 3,
Line 22, "device" should be -- actuator --.

Column 3,
Line 23, "device" should be -- actuator --.

Column 3,
Line 29, "device" should be -- actuator --.

Column 3,
Line 39, "device" should be -- actuator --.

Column 4,
Line 12, "actuated device" should be -- actuator --.

Column 4,
Line 14, "device" should be -- actuator --.

Column 4,
Line 22, "learn" should be -- learned --.

Column 4,
Line 46, delete "123"

Column 5,
Line 3, "devices" should be -- actuators --.

Column 5,
Line 6, delete "devices or"

Column 5,
Line 11, "devices" should be -- actuators --.